(12) United States Patent
Smits et al.

(10) Patent No.: US 6,832,159 B2
(45) Date of Patent: Dec. 14, 2004

(54) INTELLIGENT DIAGNOSIS OF ENVIRONMENTAL INFLUENCE ON WELL LOGS WITH MODEL-BASED INVERSION

(75) Inventors: Jan W. Smits, Sugar Land, TX (US); Peter T. Wu, Sugar Land, TX (US); Qiming Li, Sugar Land, TX (US); Cheng Bing Liu, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/249,612

(22) Filed: Apr. 23, 2003

(65) Prior Publication Data

US 2004/0010373 A1 Jan. 15, 2004

Related U.S. Application Data

(60) Provisional application No. 60/395,018, filed on Jul. 11, 2002.

(51) Int. Cl.[7] .............................................. G01V 11/00
(52) U.S. Cl. ...................................................... 702/11
(58) Field of Search ............................. 702/6, 7, 8, 11, 702/12, 13, 14; 324/339

(56) References Cited

U.S. PATENT DOCUMENTS

| | | | |
|---|---|---|---|
| 4,899,112 A | | 2/1990 | Clark et al. |
| 5,210,691 A | | 5/1993 | Freedman et al. |
| 5,214,613 A | | 5/1993 | Esmersoy |
| 5,675,147 A | * | 10/1997 | Ekstrom et al. ............ 250/256 |
| 5,703,773 A | | 12/1997 | Tabarovsky et al. |
| 5,729,451 A | * | 3/1998 | Gibbs et al. .................. 702/12 |
| 5,838,634 A | * | 11/1998 | Jones et al. .................... 367/73 |
| 6,047,240 A | | 4/2000 | Barber et al. |
| 6,205,402 B1 | * | 3/2001 | Lazaar et al. ................... 702/2 |
| 6,388,947 B1 | * | 5/2002 | Washbourne et al. ......... 367/73 |
| 6,389,361 B1 | * | 5/2002 | Geiser ......................... 702/15 |
| 6,434,435 B1 | * | 8/2002 | Tubel et al. .................. 700/30 |
| 6,665,615 B2 | * | 12/2003 | Van Riel et al. ................ 702/2 |

FOREIGN PATENT DOCUMENTS

| | | |
|---|---|---|
| EP | 0 745 870 A3 | 7/1999 |
| WO | WO 01/67135 | 9/2001 |
| WO | WO 02/50571 | 6/2002 |
| WO | WO 02/65374 | 8/2002 |
| WO | WO 02/71100 | 9/2002 |

OTHER PUBLICATIONS

Z. Barlai, "Determination of Lithology by Statistical Models," *Crain's Petrophysical Handbook*, 3rd Ed., Jun. 30, 2002.

* cited by examiner

*Primary Examiner*—Donald McElheny, Jr.
(74) *Attorney, Agent, or Firm*—Kevin P. McEnaney; Brigitte L. Echols; John J. Ryberg

(57) ABSTRACT

A method for identifying environmental effects in well log data includes selecting a plurality of models, each of the plurality of models including at least one parameter to be optimized; fitting the models to the well log data by optimizing the at least one parameter, the fitting producing a plurality of optimized models; determining an indicator of goodness of fit for each of the plurality of optimized models; and selecting a model representing a best fit of the well log data based on the indicator.

24 Claims, 4 Drawing Sheets

INTELLIGENT DIAGNOSIS OF ENVIRONMENTAL INFLUENCE ON WELL LOGS WITH MODEL-BASED INVERSION

CROSS REFERENCE TO RELATED APPLICATIONS

This invention claims benefit to U.S. Provisional Patent Application Ser. No. 60/395,018, filed on Jul. 11, 2002. This Provisional Application is hereby incorporated by reference in its entirety.

BACKGROUND OF INVENTION

1. Field of the Invention

The invention relates generally to well logging. More specifically, the present invention relates to methods and systems for interpreting data obtained with well logging tools.

2. Background Art

Determining the porosity and fluid content of subsurface earth formations are critical elements in maximizing the efficiency of oil, gas, and water ("formation fluids") exploration. In order to improve formation fluids exploration, drilling, and production operations, it is necessary to gather as much information as possible on the properties of the underground earth formations as well as the environment in which drilling takes place.

The collection of downhole information, also referred to as logging, is realized in different ways. A well tool, comprising sources and sensors for measuring various parameters, can be lowered into the borehole on the end of a cable, or wireline. The cable, which is attached to a mobile processing center at the surface, is the means by which parameter data is sent up to the surface. With this type of "wireline" logging, it becomes possible to measure borehole and formation parameters as a function of depth, i.e., while the tool is conveyed along the wellbore.

An improvement over wireline logging techniques is the collection of data on downhole conditions during the drilling process. By collecting and processing such information during the drilling process, the driller can modify or correct key steps of the operation to optimize performance and avoid financial injury due to well damage such as collapse or fluid loss. Formation information collected during drilling also tends to be less affected by the drilling fluid ("drilling mud") invasion processes or other undesirable influences as a result of borehole penetration, and therefore are closer to the properties of the virgin formation.

Schemes for collecting data of downhole conditions and movement of the drilling assembly during the drilling operation are known as measurement-while-drilling (MWD) techniques. Similar techniques focusing more on measurement of formation parameters than on movement of the drilling assembly are known as logging-while-drilling (LWD). However, the terms MWD and LWD are often used interchangeably, and use of either term herein includes both the collection of formation and borehole information, as well as data on movement of the drilling assembly. Other logging operations are carried out using coiled tubing, slick lines, logging-while-tripping, and permanent monitoring applications as known in the art.

Conventional well-logging tools, such as the resistivity tools disclosed in U.S. Pat. No. 4,899,112, issued to Clark et al., provide an extensive set of measurements that contain valuable information on the underground formations and on environmental parameters. The data must be interpreted to extract the useful information. One of the more powerful techniques for interpreting well log data is "inversion" processing. Inversion of well log data is described in a number of patents. See, for example, U.S. Pat. Nos. 6,047,240, 5,345,179, 5,214,613, 5,210,691, and 5,703,773.

Inversion processing techniques known in the art typically involve determining the spatial distribution of physical properties of earth formations surrounding the well logging instrument. Inversion processing, as shown in FIG. 1, generally includes making an initial model of the spatial distribution of formation properties (shown as 21), calculating an expected response of the well logging instrument to the model (shown as 22), and comparing (i.e., computing a difference) the expected response to the measured response of the logging instrument (shown as 23). If the difference between the expected response and the measured response exceed a predetermined threshold (shown as 24), the model is adjusted and the process is repeated (shown as 26) until the differences fall below the threshold. The model, after adjustment that results in the reduced differences, then represents a likely distribution of properties of the earth formations (shown as 25).

Raw log data can be affected to varying degrees by any of several factors such as borehole effect, tool eccentering, shoulder-bed effects, invasion, anisotropy, etc. Identifying these effects and correcting for them is challenging, especially when conclusions are needed quickly to make operational decisions.

Methods such as that shown in FIG. 1 deal with a single model, which may contain only a limited number of environmental effects. In most cases it is not practical to include all possible environmental effects because the model would become too complex, leading to slow processing and/or problematic convergence. Using such methods, an operator first needs to identify the dominant environmental effect(s), based on the log patterns, before he can choose the right processing to apply. The success of this operation depends on the knowledge and experience of the operator and is time consuming. Often, differences in responses caused by different environmental effects are subtle and difficult to identify even by a specialist. Therefore, it is desirable to have techniques that can perform such evaluations without prior knowledge of which environmental factors have influence on the log data.

SUMMARY OF INVENTION

In one aspect, embodiments of the invention relate to methods for diagnosing environmental influence on well log data. The invention provides a method for diagnosing environmental effects in well log data includes selecting a plurality of models, each of the plurality of models including at least one parameter to be optimized; fitting the each of the plurality of models to the well log data by optimizing the at least one parameter, the fitting producing a plurality of optimized models; determining an indicator of goodness of fit for each of the plurality of optimized models; and selecting a model representing a best fit of the well log data based on the indicator.

Another aspect of the invention relates to systems for diagnosing environmental influence on well log data. The invention provides a system for identifying environmental effects in well log data includes a computer having a memory for storing a program, wherein the program comprising instructions executable by the computer for selecting a plurality of models, each of the plurality of models includes at least one parameter to be optimized; fitting the each of the plurality of models to the well log data by optimizing the at least one parameter, the fitting produces a plurality of optimized models; determining an indicator of goodness of fit for each of the plurality of optimized models; and selecting a model representing a best fit of the well log data based on the indicator.

Other aspects of the invention will become apparent from the following description, the drawings, and the claims.

DETAILED DESCRIPTION

Embodiments of the invention relate to methods and systems for identifying and correcting for environmental effects in well log data. Embodiments of the invention may be performed in an automatic or partially automatic fashion using a process that, for example, analyzes the data, recognizes the effects, and corrects for them. A process in accordance with the invention assesses different formation models and selects the one(s) most consistent with the log data and, in some cases, also consistent with auxiliary data from user inputs or other sources. When a dominant environmental effect is identified, a correction may be applied to generate environmentally corrected data. In one or more embodiments of the invention, a confidence value may also be assigned to the selected model.

In accordance with the invention, model selection may be performed based on goodness of fit of the models. Furthermore, the model database may be extended to include more complex models. The techniques of the invention provide an automatic way to select a "best" model from amongst multiple model candidates. The automated selection processes in accordance with embodiments of the invention minimize the difficulties associated with log interpretation and improve the accuracy and quality of the interpretation result. It will be appreciated by those skilled in the art that this invention applies to areas other than subsurface formation analysis.

Figure 1:
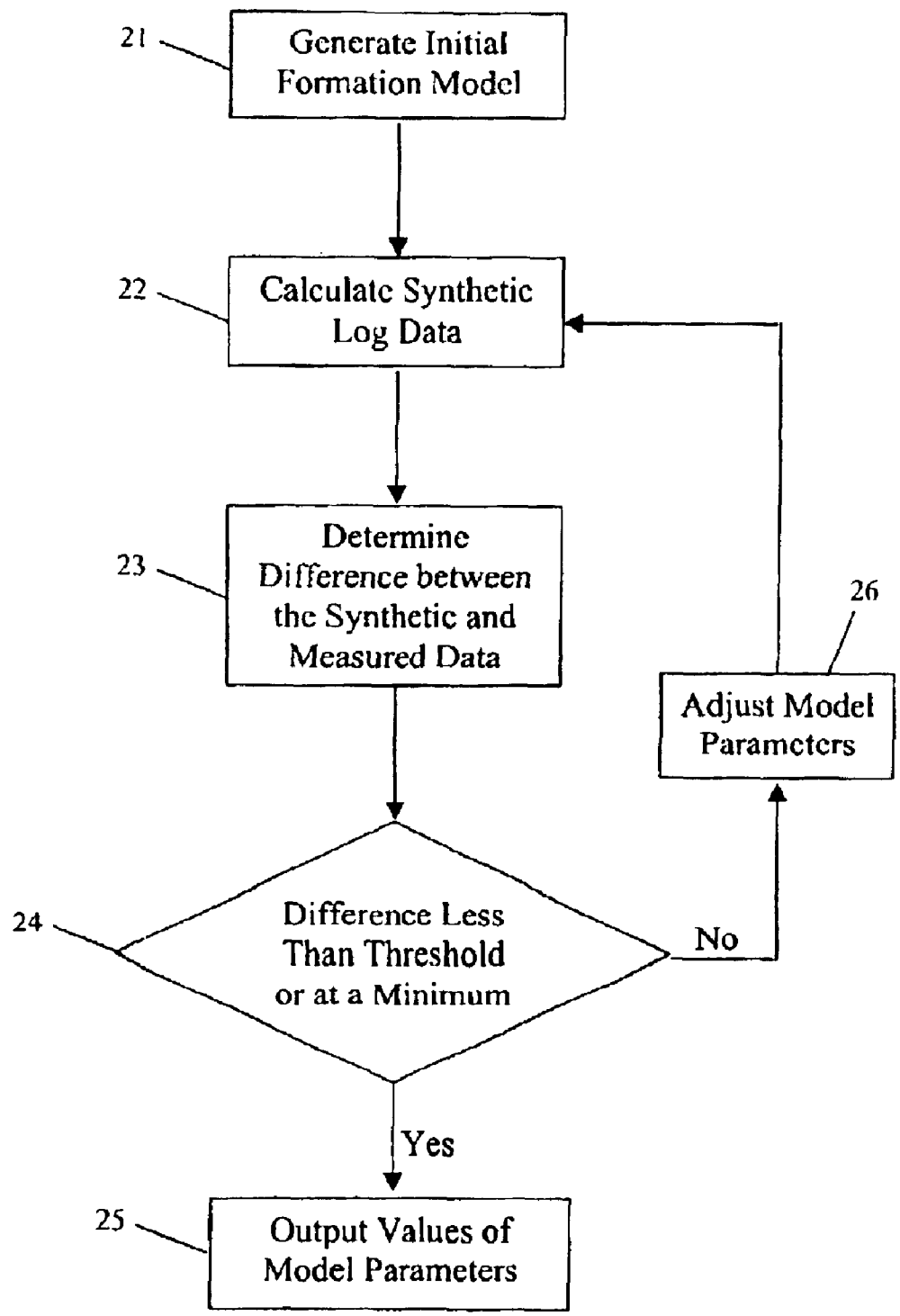
FIG. 1 shows a prior art method for inverting well log data.
Figure 2:
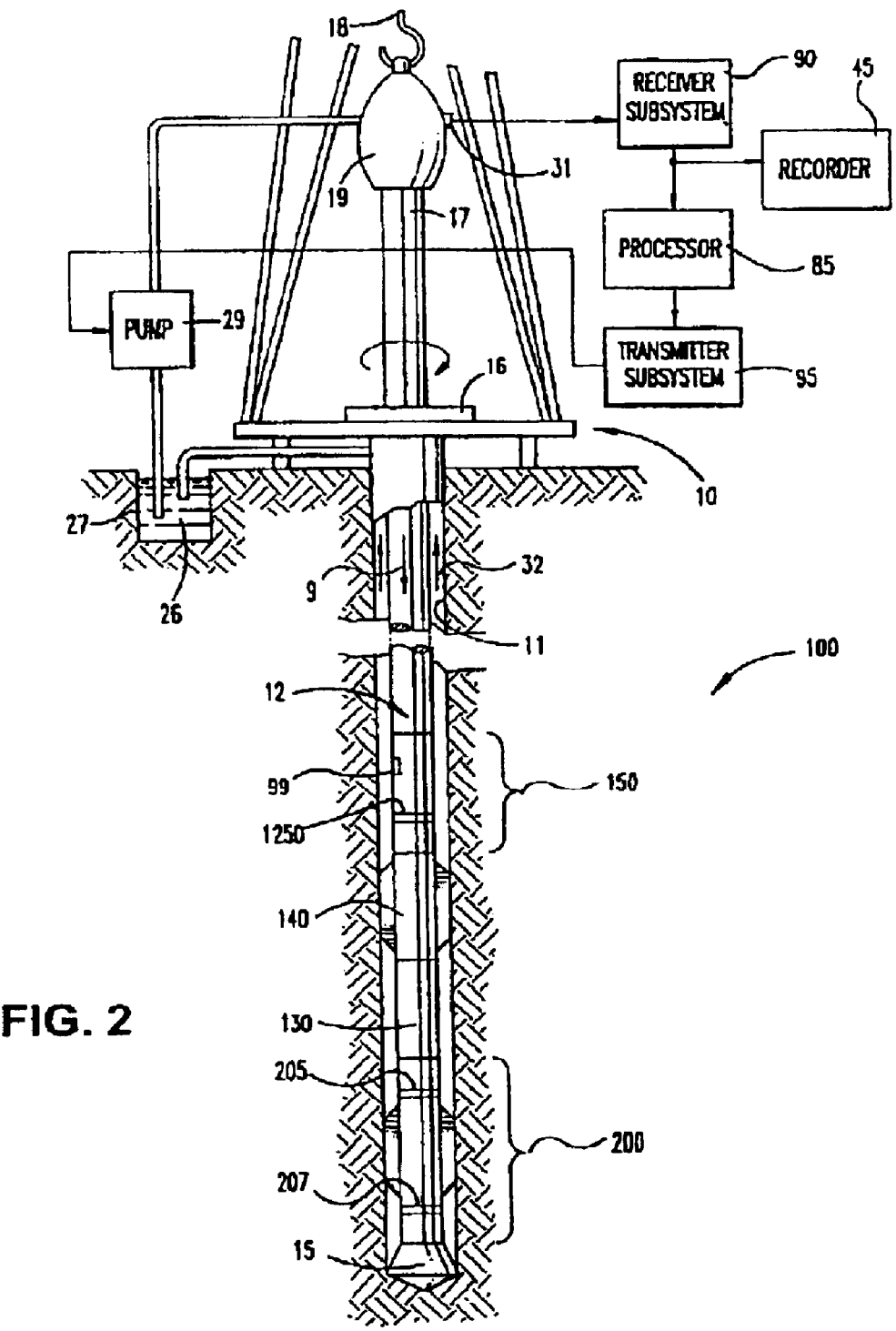
FIG. 2 shows a conventional drilling system.

Well log data that can be used with embodiments of the invention may be obtained with any well logging instrument adapted with the types of sources or sensors well known in the art. The well log data may be communicated to the surface while the tool is downhole or stored in the tool for later readout. FIG. 2 shows a drilling rig including a derrick 10 positioned over a wellbore 11. A drilling tool assembly, which includes a drill string 12 and drill bit 15 coupled to the lower end of the drill string 12, is disposed in the wellbore 11. The drill string 12 and bit 15 are turned by rotation of a kelly 17 coupled to the upper end of the drill string 12. The kelly 17 is rotated by engagement with a rotary table 16 or the like forming part of the rig 10. The kelly 17 and drill string 12 are suspended by a hook 18 coupled to the kelly 17 by a rotatable swivel 19.

Drilling fluid is stored in a pit 27 and is pumped through the center of the drill string 12 by a mud pump 29 to flow downwardly (shown by arrow 9). After circulation through the bit 15, the drilling fluid circulates upwardly (indicated by arrow 32) through an annular space between the wellbore 11 and the outside of the drill string 12. Flow of the drilling mud lubricates and cools the bit 15 and lifts drill cuttings made by the bit 15 to the surface for collection and disposal.

A bottom hole assembly (BHA) 100 is connected to the drill string 12. The BHA 100 may include a stabilizer 140 and drill collar 130 which mechanically connect a local measuring and communications device 200 to the BHA 100. In this example, the. BHA 100 includes a toroidal antenna 1250 for electromagnetic communication with the local measuring device 200. The BHA 100 may also include a communications system 150, e.g.,.a pressure modulation (mud pulse) telemetry system. Pressure modulation telemetry can include various techniques for selectively modulating the flow (and consequently the pressure) of the drilling mud. A transducer 31 disposed at the earth's surface detects the pressure variations and conducts a signal to a receiver decoder system 90 for demodulation and interpretation. The demodulated signals can be coupled to a processor 85 and recorder 45 for further processing. The surface equipment may optionally include a transmitter subsystem 95 which includes a pressure modulation transmitter (not shown separately) that can modulate the pressure of the drilling mud circulating downwardly 9 to communicate control signals to the BHA 100. One of ordinary skill in the art would appreciate that mud telemetry as described above is one example of communication means. Other telemetry systems known in the art may also be used.

The communications subsystem 150 may also include various types of processors and controllers (not shown separately) for controlling operating of sensors disposed therein, and for communication command signals to the local device 200 and receiving and processing measurements transmitted from the local device 200. Sensors in the BHA 100 and/or communications system 150 can include, among others, magnetometers and accelerometers (not shown separately in FIG. 2).

The instruments disposed in the BHA 100, the communications system 150 and the local measuring and communication device 200 will be referred to collectively hereinafter for convenience as the "LWD instrument" or "MWD instrument." The BHA 100, the processor 85, and/or the communications system 150 can include various forms of data storage or memory which can store measurements made by any or all of the sensors, including sensors disposed in the local instrument 200, for later processing as the drill string 12 is withdrawn from the wellbore 11.

Figure 3:
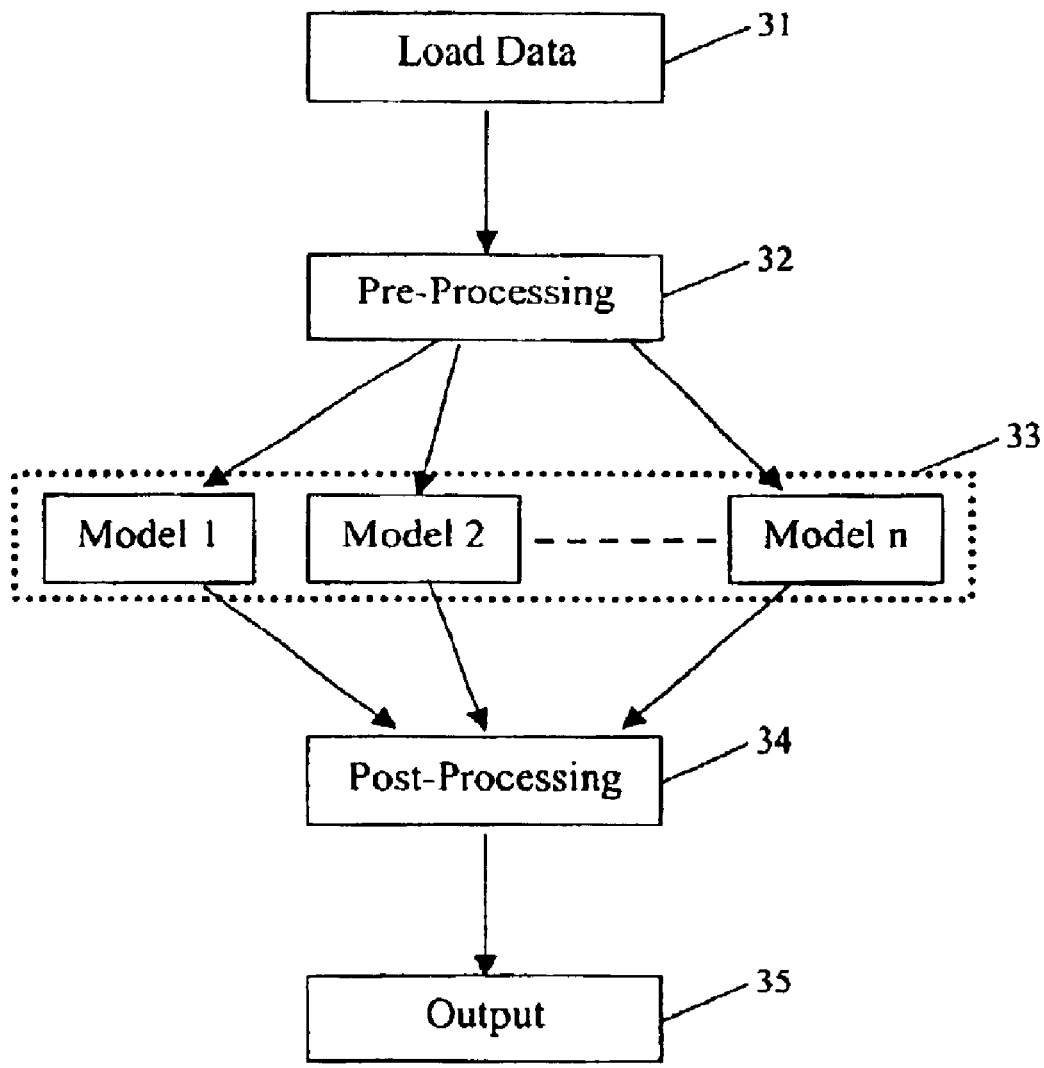
FIG. 3 shows a method in accordance with an embodiment of the invention.

Once log data are available, embodiments of the invention can then identify environmental effects that impact the log data. A method in accordance with the invention can also select the best model from among multiple model candidates based on the data. In addition, embodiments of the invention may also be used to remove the environmental effects from the log data to produce corrected data. FIG. 3 shows a flow chart of a method in accordance with embodiments of the invention. First, the formation log data are loaded into a system (shown as step 31). The system may be a surface processor (computer) shown as 85 in FIG. 2 or a processor/ computer included in the downhole tool that includes one or more memory modules to store a program for performing simultaneous model fitting/minimization in accordance with the invention. In addition to the formation logging data, the loaded data may also include information related to borehole geometry, survey data, mud information, as well as instrument information such as air calibration. Auxiliary parameters that control the working of the program may also be input at this stage. If the computer of the system is downhole, the additional information or constraints may be transmitted downhole using any telemetry known in the art.

The loaded data may be pre-processed (step 32). The pre-processing may include checking measurement data for possible logging instrument failures. For example, if the phase-shift and attenuation measurements from a resistivity tool are out of order or inconsistent, they may indicate possible tool failures. Thus, by examining the order of the curves from the resistivity measurements as well as its variation, it is possible to detect individual transmitter or receiver failure. One of ordinary skill in the art would appreciate other types of measurements can similarly be checked for possible instrument errors in this pre-processing step.

In addition, depending on the types of measurements, the log data may be pre-processed to facilitate the inversions. For example, with data from a propagation resistivity tool, the measured phase-shift and attenuation data may first be transformed into apparent resistivities by methods known in the art. Furthermore, the 400 kHz data in the conductive region and the 2 MHz data in the resistive region, for example, may be combined to produce a hybrid data for analysis.

Other pre-processing may include, for example, borehole correction (using caliper measurements, or bit size if the measurements are unavailable) and eccentricity and tool checks. Borehole correction may be performed to remove any effect caused by the annulus between the tool and the formation. Information on precise borehole geometry is often not available during drilling. In this case, bit size may be used as an approximate parameter for borehole correction.

Similarly, tool eccentricity may require correction to the measurement data. Information on the eccentricity may be derived from other measurements. For example, if the well is drilled with an oil-based-mud (OBM), eccentricity can severely affect the 2 Mhz responses, but not the 400 khz responses. By exploring this disparity, an eccentricity flag can be effectively triggered according to pre-defined algorithm. The eccentricity flag can then be incorporated in the inversion to improve the accuracy of the results.

Once the data are pre-processed, they are suitable for inversion. One of ordinary skilled in the art would appreciate that pre-processing may not be required for every type of data. Thus, a method that does not include a data pre-processing step is expressly within the scope of this invention. For data inversion, a method in accordance with the invention performs parallel model inversion, as shown in step 33 in FIG. 3. FIG. 3 illustrates that the data are fit to models 1–n in parallel. Parallelism as used herein refers to the fact that each model may be fit independently of other model fittings; it does not mean that all model fittings are performed simultaneously (temporally parallel). The models 1–n may be pre-stored in a database in the system. The various models may represent different formations (lithology) or the same formation with different parameters. Furthermore, more than one parameter may be optimized in a model.

Note that embodiments of the invention are not limited by the number of the models. The embodiment as shown in FIG. 3 can be easily extended to include more complex models. General inversion techniques, especially model-based inversion in the context of subsurface formation evaluation, are known in the art. Although this description uses "inversion" for brevity, one skilled in the art would appreciate that alternatives to the "inversions" may be used without departing from the scope of the invention. For example, U.S. Pat. No. 6,256,603, issued to Celniker (assigned to the present assignee), discloses a simulation-based interpretation method as an alternative to the conventional "inversion" method.

As noted above the model fitting may use any minimization algorithms, including the Gauss-Newton algorithm, Levenberg-Marquart algorithm, downhill simplex algorithm, simulated annealing, grid search, and the like. One skilled in the art would appreciate that different algorithms may be better suited in different situations. For example, the Levenberg-Marquardt algorithm, which is a modified Gauss-Newton algorithm, is found to be an efficient and robust method for the minimization of non-quadratic objective functions. After local linearization of the objective function with respect to the parameters to be estimated, the Levenberg-Marquardt algorithm first takes small, but robust, steps along the steepest descent direction. The method later switches to the more efficient quadratic Gauss-Newton steps when approaching the minimum.

Once the model fittings are complete, the best match between the measured data and the model response is found through comparison of an error function (i.e., an indicator of goodness of fit), which may be part of the post-processing (shown as step 34 in FIG. 3).

One of the ways to measure the goodness of fit is to calculate the errors for each model for the best parameter. For example, an error function (Err) may be defined as:

$$\text{Err} = \{\{\Sigma[(PS_{th}(i)PS_m(i))/PS_m(i)]^2 + \Sigma[(AD_{th}(i)Ad_m(i))/AD_m(i)]^2\}/N\}^{1/2}, \quad (1)$$

where $PS_m$ and $AD_m$ and $PS_{th}$ and $Ad_{th}$ are air calibrated Mixed Borehole-Compensated (MBHC) phase-shift (PS) in degree and attenuation in dB (AD), the m and th subscripts indicate measured and theoretical values, respectively; N is the total number of channels used. This error function is essentially a root mean square (RMS) of errors between the model and measurements. Note that, in some situations, it may be necessary to scale the error function properly, taking into account the number of unknowns and the number of inputs to the models. Once the errors among all the models are computed, they can be compared to identify the best model or the parameter that has the dominant effect. These errors may be converted to percentages (percent errors) to facilitate comparison between models. Note that the best model selected should be consistent with the petrophysical constraints. For example, invasion should not be identified as the correct model (parameter) in non-permeable zones such as in shale zones.

Furthermore, post-processing may take into account the inversion error as well as petrophysical constraints and the selection of the possible models among all available models. The process may select the best model that matches the measurement data as the true answer and in addition assigns confidence with the interpretation.

Once the environmental influence is identified and the model is selected, a method in accordance with the invention may produce an output (shown as 35), which may include the parameters for the selected model, a corrected data set that is devoid of the environmental influence, and other information.

The method described above is an exemplary method in accordance with one embodiment of the invention. Other variations and enhancements may be added to this basic process to produce more robust and reliable results. For example, as noted above, raw data can be pre-processed to be corrected for certain effects such as borehole effect. Similarly, other environmental factors may be taken into account in the pre-processing. Environmental effects, for which there is no good model-based inversion, may be identified through heuristic rules.

In the post-processing described above, the quality-criterion for each inversion result may also include other constraints in addition to the reconstruction errors. Examples of such constraints include those based on auxiliary data, such as mud-type, borehole size, etc.

Furthermore, the operator may be given the ability to over-rule the automatic choice of a model made by the program and force application of a different model. Additional rules can be added to constrain the selection of the best model. For example, a model implying conductive invasion could be ruled out, if the mud type is oil-based mud. In addition, rules may be incorporated in the algorithm such that a simpler model is given preference over a more complicated one, if the reconstruct errors between the two models are substantially similar.

Post-processing may also include a filtering process to remove occasional undesirable and nonphysical switching between models. The filtering process may be controlled based on the resolution inherent in the data. This filtering process may improve the presentation of the results.

Besides the choice of models and environmentally corrected outputs, additional outputs can be generated. For example, an output may be generated to indicate the confidence in the result. The confidence indicator may be based on a comparison of the reconstructions of the different inversions. For example, if the fitting error of one of the models is extremely small, while all others are large, then there is high confidence that the identified model is correct. On the other hand, if two or more models have similar fitting errors and all of these models are consistent with the known petrophysical constraints, then the confidence that a correct model is identified would be low. In this case, additional data/information would be required in order to eliminate some models. Finally, if all models fit the measurement data equally well, it is possible that the formation is homogeneous. It is also possible that none of the models fit the log data well in some situations. This situation indicates that either the effect (model/parameter) is not in the database or multiple effects (parameters) influence the log data and no single effect dominates.

A confidence function for this purpose may be defined, for example, as follows:

$$\text{Confidence} = W_{err}/\text{Max}[\text{Err1}, c1] + W_{dif} \times \text{Min}[(\text{Err1} - \text{Err2}), c2], \quad (2)$$

where $W_{err}$ and $W_{dif}$ are two weighting factors that need to be judiciously chosen; Err1 is the error of the smallest error among the models; Err2 is the next smallest error among the models; and c1 and c2 are two constants, the values of which depend on how error criteria are defined and may be adjusted such that the confidence ranges from 0 to 100% if Err1 and Err2 are very close, then the confidence level should be low.

Figure 4:
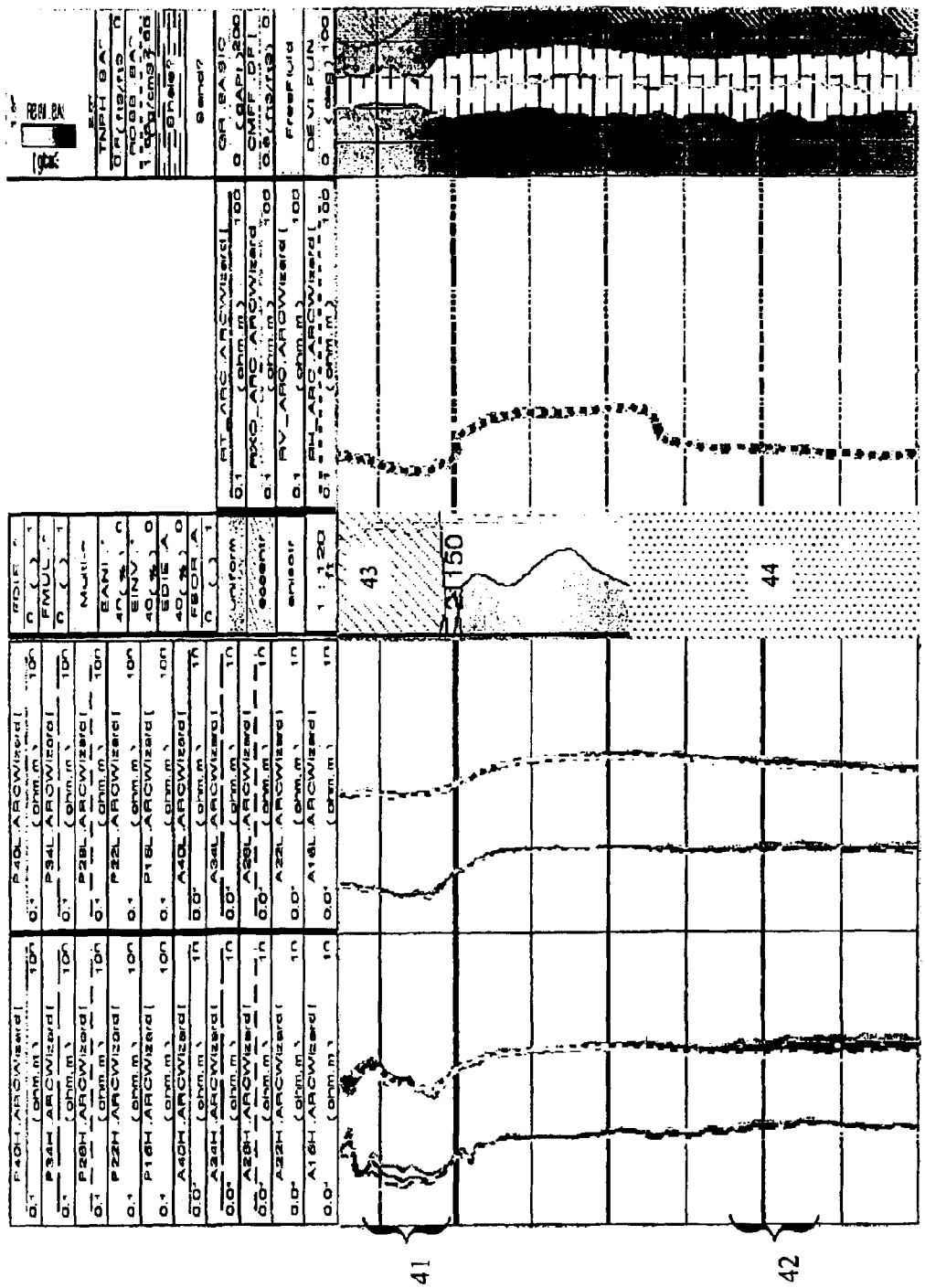
FIG. 4 illustrates an exemplary output from a method in accordance with an embodiment of the invention.

FIG. 4 illustrates a sample output from an embodiment of the invention. In this figure, the first Track shows the 2 MHz resistivity logs, the second Track shows the 400 kHz resistivity logs, the third Track shows parameters (environmental effects) that have the most influence on the measurement data as predicted using a method in accordance with the invention.

As shown in FIG. 4; the resistivity logs show two regions of divergence. Track 1 shows that the phase-shift and attenuation 2 MHz measurements based on different transmitter-receiver spacings vary significantly in depth region 41, while Track 2 shows the 400 kHz measurements do not have such a divergence in the same region. In depth region 42, the divergences are observed in all measurements, including phase-shift and attenuation measurements in Track 1 (2 MHz measurements) and the 400 kHz measurements in Track 2. Such curve separation (divergence) usually indicates the presence of environmental influence in the resistivity measurements. To identify the environmental factors that cause this divergence, the resistivity data shown in Track 1 and Track 2 are processed using a method in accordance with embodiments of the present invention. The processed results are displayed in Track 3 and Track 4.

Track 3 shows the identified environmental effects in different patterns. Specifically, the striped pattern 43 indicates that tool eccentricity causes the divergence of the traces shown in depth region 41 in Track 1, while the dotted pattern 44 indicates that formation anisotropy causes the divergence in the traces shown in depth region 42 in Track 1 and Track 2. The confidence of such identification is also shown by the height of the patterned areas, from low confidence on the left to high confidence on the right of the column.

Track 4 displays the corrected resistivity curves. The environmentally corrected formation resistivity, as shown in Track 4, are consistent with the models (parameters) predicted by embodiments of the invention. As shown in Track 4. the corrected $R_v$ and $R_h$ resistivity curves in depth region 41 show little separation, indicating that there is no formation anisotropy in this region. This result is consistent with the prediction that the separation of the measurement curves in Track 1 arises from tool eccentricity rather than formation anisotropy, as shown in Track 3. In contrast, the corrected vertical $R_v$ resistivity curve is very different from the corrected horizontal $R_h$ resistivity curve in depth region 42, indicating that the formation is anisotropic in this region. The corrected resistivity curves in Track 4 show only $R_v$ and $R_h$ curves diverge in certain areas, while $R_t$ and $R_{xo}$ curves remain coherent. This indicates the absence of invasion by drilling mud. Otherwise, the true formation resistivity $R_t$ and the invaded zone resistivity $R_{xo}$ may also display divergence.

The above identification is consistent with the lithology of the formation. In Track 5, the density, neutron porosity, and Gamma ray, and density image from an azimuthal LWD density tool in the same tool string as the propagation resistivity tool is displayed. Depth region 41 is clearly very conductive water sand. With such a low resistivity, eccentricity effect on 2 Mz is commonly observed. In depth region 42, the density image shows increasing lamination which tends to create anisotropy in resistivity, in support of the interpretation that the curve separations are due to resistivity anisotropy.

The process of the invention analyzes the data and through comparing inversion fit error, automatically determines and displays this to the operator. To facilitate interpretation of outputs of the method, the selected model may be indicated with a predefined color scheme or with a different color representing a different effect (model). For example, pink may indicate anisotropy effect, brown invasion, and gray homogeneous (uniform) formation. The confidence for such identification may be indicated by a shaded area under the curve, ranging from 0 to 100%.

While the above example uses resistivity logs for illustration, embodiments of the invention are not limited to measurements made by any particular logging instrument or sensor. It should be clearly understood that the invention is usable with borehole and formation measurement data acquired with any suitable source/sensor. For example, embodiments of the invention may be applied to neutron logging data, gamma-ray data, seismic data, nuclear magnetic resonance data, electromagnetic propagation/induction data, acoustic data, and the like. The processes in accordance with embodiments of the invention may also be carried out downhole (e.g., in an LWD or MWD tool), at the well surface, or at any remote location as desired.

It will also be apparent to those of ordinary skill having the benefit of this disclosure that the invention may be implemented by programming one or more suitable general-purpose computers/processors (e.g., the processor shown as 85 in FIG. 2). The programming may be accomplished through the use of one or more program storage devices (memory modules) readable by the computer processor and encoding one or more programs of instructions executable by the computer/processor for performing the operations described herein. The program storage device may take the form of, e.g., one or more floppy disks; a CD-ROM or other optical disk; a magnetic tape; a read-only memory chip (ROM); and other forms known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Further, as known in the art, the invention may be fully implemented downhole with a tool equipped with adequate hardware if desired.

Advantageously, embodiments of the invention provide automatic methods for identifying environmental effects that influence the well log data and for selecting a best model from amongst multiple models. The automated selection processes in accordance with embodiments of the invention do not rely on operator expertise or experience, minimize the difficulties associated with log interpretation, and improve the accuracy and quality of the interpretation result.

For the purposes of this specification it will be clearly understood that the word "comprising" means "including but not limited to", and that the word "comprises" has a corresponding meaning.

What is claimed is:

1. A method for identifying an environmental effect in well log data, comprising:
    selecting a plurality of models, each of the models including at least one parameter to be optimized;
    fitting each of the models to the well log data by optimizing the at least one parameter, the fitting producing a plurality of optimized models;
    determining indicators of goodness of fit for the plurality of optimized models; and
    identifying the environmental effect from a comparison of the indicators of the goodness of fit.

2. The method of claim 1, further comprising selecting a model representing a best fit of the well log data based on the indicator.

3. The method of claim 2, further comprising generating a set of parameters representing the selected model.

4. The method of claim 1, wherein the well log data include information related to formation resistivity.

5. The method of claim 1, wherein the at least one parameter is a borehole dimension, invasion zone, dielectric property, formation anisotropy, or tool eccentricity.

6. The method of claim 1, further comprises generating a connected data set in which the environmental effect has been removed.

7. The method of claim 1, further comprising pre-processing the well log data.

8. The method of claim 7, wherein the pre-processing comprises one selected from the group consisting of tool failure check, bit size borehole correction, and eccentricity check.

9. The method of claim 1, wherein the indicator of goodness of fit is a function representing a root mean square of errors between the optimized models and the well log data.

10. The method of claim 1, further comprising post-processing.

11. The method of claim 10, wherein the post-processing comprises check for consistence with additional petrophysical or geological constraints.

12. The method of claim 10, wherein the post-processing comprises generating a confidence indicator for the selected model.

13. The method of claim 12, wherein the confidence indicator is related to $$W_{err}/\text{Max}[\text{Err1},c1]+W_{dif}\times\text{Min}[(\text{Err1}-\text{Err2}),c2]$$

wherein $W_{err}$ and $W_{dif}$ are two weighting factors, Err1 is a least error among the plurality of optimized models, Err2 is a next least error among the plurality of optimized models, and c1 and c2 are two constants.

14. A system for identifying an environmental effects in well log data, comprising:
    a computer adapted to store a program, wherein the program includes instructions executable by the computer for
    selecting a plurality of models, each of the models including at least one parameter to be optimized;
    fitting each of the models to the well log data by optimizing the at least one parameter, the fitting producing a plurality of optimized models
    determining indicators of goodness of fit for the plurality of optimized models; and
    identifying the environmental effect from comparison of the indicators of the goodness of fit.

15. The system of claim 14, wherein the program includes instructions for selecting a model representing a best fit of the well log data based on the indicator.

16. The system of claim 15, wherein the program includes instructions for generating parameters representing the selected model.

17. The system of claim 14, wherein the program includes instructions for generating a corrected data set in which the environmental effect has been removed.

18. The system of claim 14, wherein the program includes instructions for pre-processing the well log data.

19. The system of claim 18, wherein the pre-processing comprises one selected from the group consisting of tool failure check, bit size borehole correction, and eccentricity check.

20. The system of claim 14, wherein the indicator of goodness of fit is a function representing a root mean square of errors between the each of the plurality of optimized models and the well log data.

21. The system of claim 14, wherein the program includes instructions for post-processing.

22. The system of claim 21, wherein the post-processing comprises checking for consistence with additional constraints.

23. The system of claim 21, wherein the post-processing comprises generating a confidence indicator for the selected model.

24. The system of claim 23, wherein the confidence indicator is related to $$W_{err}/\text{Max}[\text{Err1},c1]+W_{dif}\times\text{Min}[(\text{Err1}-\text{Err2}),c2]$$

wherein $W_{err}$ and $W_{dif}$ are two weighting factors, Err1 is at least error among the plurality of optimized models, Err2 is a next least error among the plurality of optimized models, and c1 and c2 are two constants.

* * * * *